(12) United States Patent
Nakai et al.

(10) Patent No.: US 8,059,930 B2
(45) Date of Patent: Nov. 15, 2011

(54) OPTICAL FIBER AND METHOD FOR FABRICATING THE SAME

(75) Inventors: Tadahiko Nakai, Hyogo (JP); Takaharu Kinoshita, Hyogo (JP); Takeshi Satake, Hyogo (JP); Takeji Akutsu, Hyogo (JP); Motohiko Yamasaki, Hyogo (JP)

(73) Assignee: Mitsubishi Cable Industries, Ltd., Tokyo (JP)

( * ) Notice: Subject to any disclaimer, the term of this patent is extended or adjusted under 35 U.S.C. 154(b) by 0 days.

(21) Appl. No.: 12/811,715

(22) PCT Filed: Dec. 19, 2008

(86) PCT No.: PCT/JP2008/003873
§ 371 (c)(1),
(2), (4) Date: Jul. 6, 2010

(87) PCT Pub. No.: WO2009/087728
PCT Pub. Date: Jul. 16, 2009

(65) Prior Publication Data
US 2010/0278503 A1  Nov. 4, 2010

(30) Foreign Application Priority Data
Jan. 11, 2008  (JP) .................... 2008-004406

(51) Int. Cl.
*G02B 6/02* (2006.01)
*G02B 6/10* (2006.01)
*C03B 37/022* (2006.01)
(52) U.S. Cl. .................... 385/123; 385/146; 65/403
(58) Field of Classification Search .......... None
See application file for complete search history.

(56) References Cited

U.S. PATENT DOCUMENTS

| | | | | |
|---|---|---|---|---|
| 5,566,267 A * | 10/1996 | Neuberger | .............. | 385/123 |
| 6,004,315 A | 12/1999 | Dumont | | |
| 6,179,830 B1 | 1/2001 | Kokubu | | |
| 2007/0189685 A1* | 8/2007 | Choi et al. | .............. | 385/123 |
| 2009/0274428 A1* | 11/2009 | Chen et al. | .............. | 385/127 |

FOREIGN PATENT DOCUMENTS

| | | |
|---|---|---|
| JP | 53100255 A * | 9/1978 |
| JP | 57-20703 | 2/1982 |
| JP | 58-145901 | 8/1983 |
| JP | 59-137069 | 6/1984 |
| JP | 63-311946 | 12/1988 |
| JP | 3-49591 | 7/1991 |
| JP | 4-144943 | 5/1992 |
| JP | 05-288967 | 11/1993 |

(Continued)

OTHER PUBLICATIONS

International Search Report for corresponding International Application No. PCT/JP2008/003873 dated Jan. 9, 2009.
Form PCT/ISA/237 for corresponding International Application No. PCT/JP2008/003873 dated Jan. 9, 2009.
International Search Report for International Application No. PCT/JP2008/003874 dated Jan. 16, 2009.

(Continued)

*Primary Examiner* — Uyen Chau N Le
*Assistant Examiner* — Chris Chu
(74) *Attorney, Agent, or Firm* — Renner, Otto, Boisselle & Sklar, LLP

(57) ABSTRACT

An optical fiber includes a core (1a) having an oblong rectangular or square cross section and made of quartz, and a cladding (2) surrounding the core (1a), having a circular outer cross-sectional shape, and made of resin.

2 Claims, 5 Drawing Sheets

FOREIGN PATENT DOCUMENTS

| | | |
|---|---|---|
| JP | 10-33549 | 2/1998 |
| JP | 2001-502438 | 2/2001 |
| JP | 2003-131047 | 5/2003 |
| JP | 2005-049693 | 2/2005 |

OTHER PUBLICATIONS

Co-pending U.S. Application filed on Jul. 2, 2010 (application provided).

* cited by examiner

OPTICAL FIBER AND METHOD FOR FABRICATING THE SAME

TECHNICAL FIELD

The present invention relates to optical fibers and methods for fabricating the same, and more particularly relates to an optical fiber for a laser guide used to transmit laser beams, and a method for fabricating the same.

BACKGROUND ART

Laser guides have been widely used, as optical fiber components for transmitting laser beams with high energy density, for machining equipment, etc.

Incidentally, laser machining for a surface ablation process for semiconductor, etc., using a laser beam emitted through a laser guide requires that the intensities of a laser beam at the spot irradiated with the laser beam be uniform.

A conventional optical fiber including, e.g., a core having a circular cross section, and a cladding surrounding the core is configured such that the distribution of the intensities of a laser beam at the spot irradiated with the laser beam corresponds to a Gaussian distribution. Therefore, in order to obtain uniform intensities of the laser beam at such an irradiated spot, mode scrambling is required. Here, mode scrambling denotes a process for inducing the interchange of optical power between modes in an optical waveguide, e.g., by winding an optical fiber while bending the optical fiber within the range of allowable bend radii of the fiber. However, since this mode scrambling requires the winding of an optical fiber, the optical fiber may be broken, and the size of a mode scrambling device (mode scrambler) may increase. In addition, sufficiently uniform light intensities cannot be obtained by merely winding an optical fiber having a length of hundreds of meters. This decreases processing efficiency.

PATENT DOCUMENT 1 describes an optical waveguide fiber including a core material functioning to allow light to propagate and having a rectangular cross section.

PATENT DOCUMENT 1: Japanese Examined Patent Publication No. H03-49591

SUMMARY OF THE INVENTION

Technical Problem

Here, although PATENT DOCUMENT 1 describes that an optical waveguide fiber functions to obtain a uniform light intensity distribution, PATENT DOCUMENT 1 does not describe the detailed structure of the optical waveguide fiber. If a core and a cladding of such an optical waveguide fiber are both made of quartz, the numerical aperture (NA) with which light can be transmitted is small. Therefore, laser beams escape from the fiber due to mode scrambling, and thus, the transmission of higher-order mode laser beams is difficult. Alternatively, if a core and a cladding of such an optical waveguide fiber are both made of resin, laser beams transmitted through the fiber may melt the main unit of the fiber. Therefore, it is difficult to use the optical waveguide fiber to transmit laser beams with high energy density.

The present invention has been made in view of the foregoing point, and it is an object of the invention is to achieve an optical fiber from which a laser beam with uniform irradiation intensities is emitted.

Solution to the Problem

In order to achieve the above object, the present invention is configured such that an optical fiber includes a core having a rectangular cross section and made of quartz, and a cladding surrounding the core, having a circular outer cross-sectional shape, and made of resin.

Specifically, an optical fiber according to the present invention includes a core having an oblong rectangular or square cross section and made of quartz; and a cladding surrounding the core, having a circular outer cross-sectional shape, and made of resin.

The above structure allows the core to have a rectangular cross section, thereby obtaining uniform irradiation intensities of a laser beam emitted from one fiber end. Furthermore, since the core is made of quartz generally having high heat resistance, a laser beam with high energy density can be transmitted. Moreover, since the cladding is made of resin generally having a low refractive index, the refractive index of the cladding is lower than that of the core. Thus, a laser beam entering the core is transmitted while being repeatedly reflected off the interface between the core and the cladding. In view of the above, a laser beam with high energy density enters the end of the core corresponding to one fiber end, and is transmitted through the core, and then the transmitted laser beam with uniform irradiation intensities is emitted from the end of the core corresponding to the other fiber end. This can provide an optical fiber from which a laser beam with uniform irradiation intensities is emitted.

Corners of a cross section of the core may each have a radius of curvature of $1/100$-$1/10$ of the length of a long side of the oblong rectangle forming the cross section of the core or the length of one side of the square forming the cross section of the core.

With the above structure, since the corners of a cross section of the core each have a radius of curvature in a predetermined range, the optical fiber according to the present invention is specifically configured.

The cladding may be made of a thermosetting silicone resin.

With the above structure, since the thermosetting silicone resin forming the cladding generally has a low viscosity, a thick cladding is formed to cover the core. This can facilitate allowing the outer cross-sectional shape of the cladding to be circular.

A method for fabricating an optical fiber according to the present invention includes: forming a core having a rectangular cross section by heating and stretching a core material having an oblong rectangular or square cross section and made of quartz; and forming a cladding having a circular outer cross-sectional shape by coating a side surface of the core with resin. In the forming the core, the core material is heated and stretched at 1950-2050° C.

According to the above-described method, since the core material having a rectangular cross section is heated and stretched in an atmosphere at 1950-2050° C. in the core formation process step, the corners of a rectangular cross section of the core each have a radius of curvature of $1/100$-$1/10$ of the length of a long side of the rectangle forming the cross section of the core or the length of one side of the square forming the cross section of the core. This allows the core to have a specific rectangular cross section, thereby obtaining uniform irradiation intensities of a laser beam emitted from one fiber end. Furthermore, since the core is made of the core material of quartz generally having high heat resistance, a laser beam with high energy density can be transmitted. Moreover, since the cladding is made of resin generally having a low refractive index, the refractive index of the cladding is lower than that of the core. Thus, a laser beam entering the core is transmitted while being repeatedly reflected off the interface between the core and the cladding. In view of the above, a laser beam with high energy density enters the end of the core corresponding to one fiber end, and is transmitted through the core, and then the transmitted laser beam with uniform irradiation intensities is emitted from the end of the core corresponding to the other fiber end. This can provide an optical fiber from which a laser beam with uniform irradiation intensities is emitted.

ADVANTAGES OF THE INVENTION

According to the present invention, an optical fiber includes a core having a rectangular cross section and made of quartz, and a cladding surrounding the core, having a circular outer cross-sectional shape, and made of resin. This can provide an optical fiber from which a laser beam with uniform irradiation intensities is emitted.

BRIEF DESCRIPTION OF THE DRAWINGS

FIG. 2 is a schematic view illustrating a process for fabricating the optical fiber 10a.

FIG. 3 is a graph illustrating the relationship between the temperature of a drawing furnace and the radius of curvature R of each of the corners of a core forming a portion of the optical fiber 10a.

FIG. 5 is the profile of a laser beam emitted from an embodiment corresponding to the optical fiber 10a.

DESCRIPTION OF REFERENCE CHARACTERS

C Corner
1a, 1b Core
2 Cladding
5 Core Material
6 Silicone Resin
10a, 10b Optical Fiber

DESCRIPTION OF EMBODIMENTS

Embodiments of the present invention will be described hereinafter with reference to the drawings. The present invention is not limited to the following embodiments.

<<First Embodiment of the Invention>>

Figure 1:
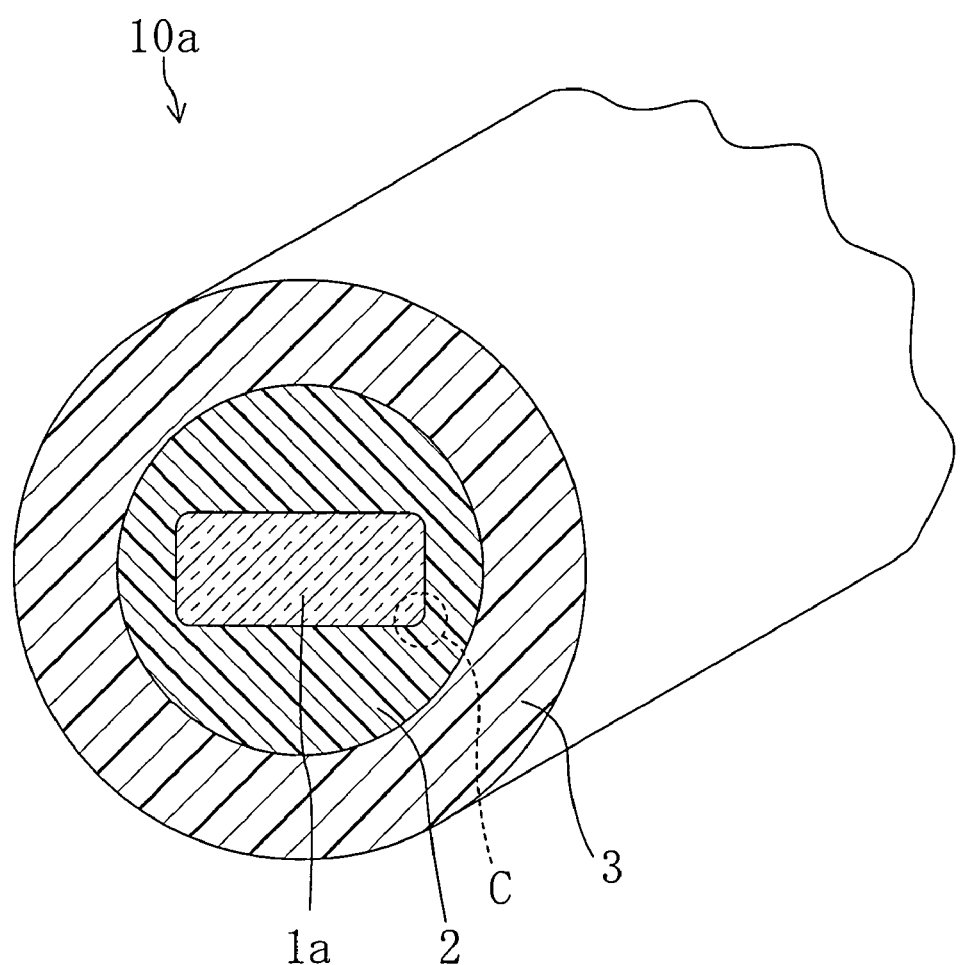
FIG. 1 is a perspective view illustrating an optical fiber 10a according to a first embodiment.

FIGS. 1-5 illustrate an optical fiber according to a first embodiment of the present invention and a method for fabricating the same. Specifically, FIG. 1 is a perspective view illustrating an optical fiber 10a of this embodiment.

As illustrated in FIG. 1, the optical fiber 10a includes a centrally located core 1a having an oblong rectangular cross section, a cladding 2 surrounding the core 1a and having a circular outer cross-sectional shape, and a cylindrical protection layer 3 surrounding the cladding 2.

The core 1a is made of quartz, and the corners C of the oblong rectangular cross section of the core 1a each have a radius of curvature of $1/100$-$1/10$ of the length of a long side of the oblong rectangle.

The cladding 2 is made of, e.g., a thermosetting silicone resin, and has a lower refractive index (e.g., 1.408) than the core 1a (made of pure quartz).

The protection layer 3 is made of, e.g., polyamide resin, and is provided to protect the core 1a and the cladding 2 from external shock and others.

The optical fiber 10a having the above-described structure allows a laser beam entering the end of the core 1a corresponding to one fiber end to be transmitted while being repeatedly reflected off the interface between the core 1a and the cladding 2, and then to be emitted from the end of the core 1a corresponding to the other fiber end.

Figure 2:
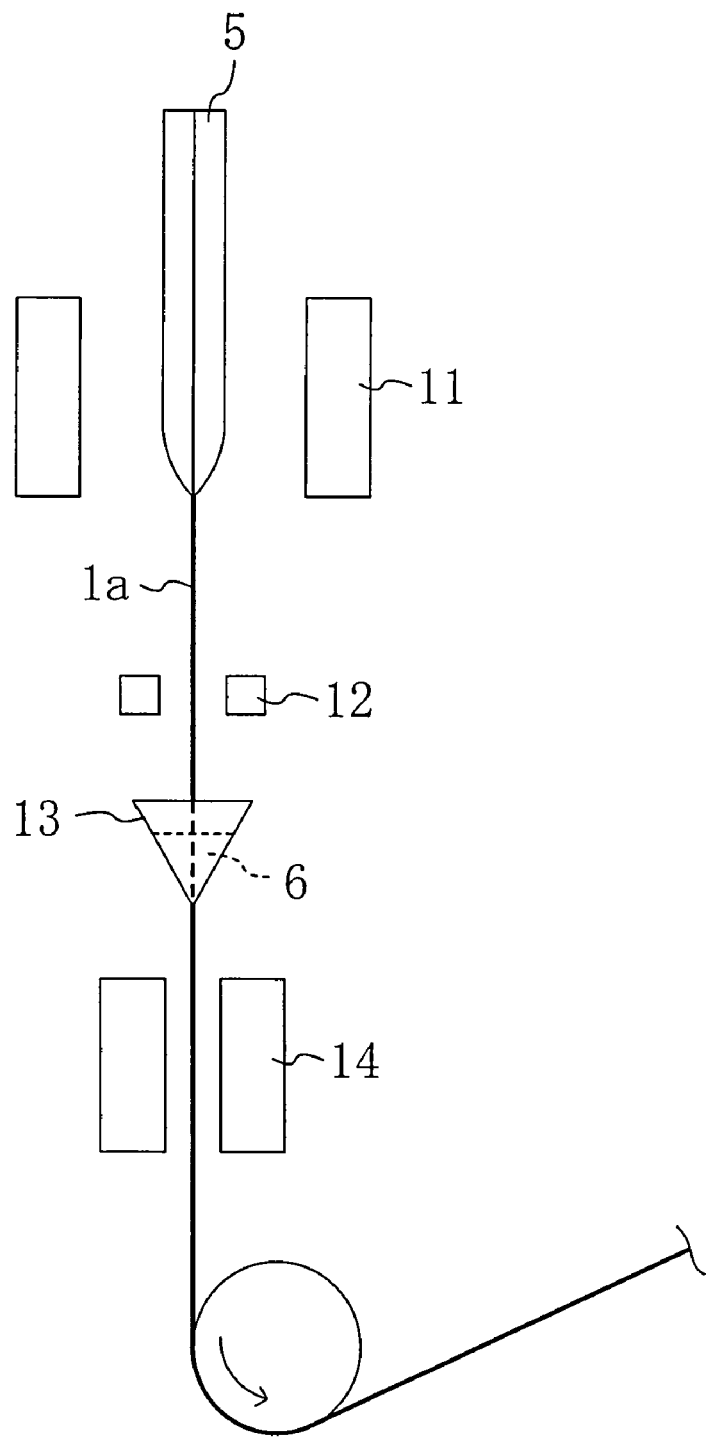

Next, a method for fabricating the optical fiber 10a of this embodiment will be described with reference to FIG. 2. Here, FIG. 2 is a schematic view illustrating a process for fabricating the optical fiber 10a. The fabrication method of this embodiment includes a core formation process step, a cladding formation process step, and a protection layer formation process step. In this embodiment, the fabrication method including the protection layer formation process step is illustrated as an example. However, the protection layer formation process step is not essential for the present invention. Therefore, the protection layer formation process step may be omitted, and thus, the protection layer 3 of the optical fiber 10a may be omitted.

<Core Formation Process Step>

As illustrated in FIG. 2, a core material 5 made of quartz is heated and stretched in a drawing furnace 11 having a temperature set at 1950-2050° C., and is drawn into fibers at a predetermined speed (1 m/min-20 m/min). Thus, a core 1a is formed to have an oblong rectangular cross section. The dimensions of the core material 5 are, e.g., approximately 25 mm high by 12.5 mm wide by 200 mm long, and the corners C of a cross section of the core material 5 each have a radius of curvature of approximately less than or equal to 1 mm. The height and width of the core 1a immediately after the ejection of the core 1a from the drawing furnace 11 are measured using a first measurement unit 12 in a non-contact manner. The speed at which the core material 5 is delivered, the speed at which the core material 5 is drawn into the core 1a (the drawing speed of the core 1a), and other conditions are adjusted based on the measured data, thereby allowing the core 1a to have a predetermined size.

Figure 3:
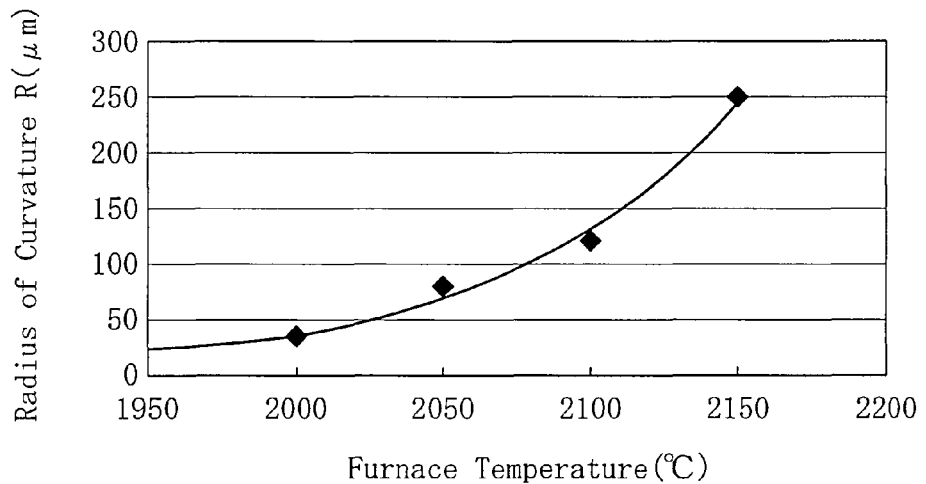

Here, FIG. 3 is a graph illustrating the relationship between the temperature of the drawing furnace 11 and the radius of curvature R of each of the corners C of a cross section of the core 1a formed in the core formation process step. FIG. 3 illustrates data under the following conditions: the drawing speed of the core 1a is 5 m/min; and the core 1a is formed which has a short side having a length of 350 μm and a long side having a length of 700 μm. The radius of curvature R of each of the corners C of the core 1a increases with an increase in the temperature of the drawing furnace 11 as illustrated in FIG. 3 without affecting the drawing speed of the core 1a very much. Therefore, when the temperature of the drawing furnace 11 is set at 1950-2050° C., this allows the radius of curvature R of each of the corners C of a cross section of the core 1a to be $1/100$ (e.g., approximately 7 μm)-$1/10$ (e.g., approximately 70 μm) of the length of a long side (e.g., approximately 700 μm) of the oblong rectangle forming the cross section. Alternatively, if the temperature of the drawing furnace 11 is set lower than 1950° C., the core material 5 is insufficiently softened, and thus, drawing, i.e., formation of the core 1a, becomes difficult. If the temperature of the drawing furnace 11 is set higher than 2050° C., the radius of curvature R of each of the corners C of the core 1a is increased too much, leading to deterioration of the characteristics required by a laser guide used for a surface ablation process for semiconductor.

<Cladding Formation Process Step>

As illustrated in FIG. 2, the core 1a formed in the core formation process step is immersed in a thermosetting silicone resin 6 filling a coating die 13 and having a low viscosity (e.g., 2.5 Pa·s), and then heated at approximately 400-600° C. through a calcining furnace 14. Thus, a cladding 2 is formed around the core 1a to have a circular outer cross-sectional shape and a predetermined outside diameter. Here, since the silicone resin 6 forming the cladding 2 generally has a low viscosity, a thick cladding 2 is formed to cover the core 1a. This can facilitate allowing the outer cross-sectional shape of the cladding 2 to be circular.

<Protection Layer Formation Process Step>

A cylindrical protection layer 3 is formed around the cladding 2 formed in the cladding formation process step by using, e.g., an extrusion die (not illustrated) of polyamide resin.

In the above-described manner, the optical fiber 10a of this embodiment can be fabricated.

Next, the profile of a laser beam from the optical fiber 10a of this embodiment, and the profile of a laser beam from a conventional optical fiber including a core having a circular cross section will be described with reference to FIGS. 4, 5, and 7. Here, FIG. 4 is a schematic view illustrating a measurement system for measuring the profile of a laser beam emitted from an optical fiber.

Figure 4:
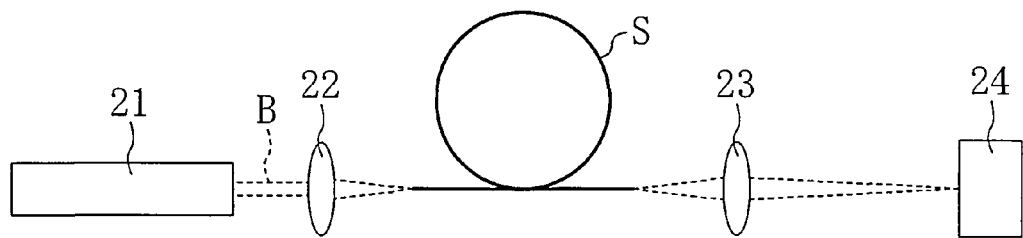
FIG. 4 is a schematic view illustrating a measurement system for measuring the profile of a laser beam emitted from the optical fiber.

As illustrated in FIG. 4, the measurement system includes a He—Ne laser 21 having, e.g., a lasing wavelength of 633 nm, an entry condenser lens 22 configured to collect laser beams B successively emitted from the He—Ne laser 21 and having an NA of 0.016, a measured fiber S into which the laser beams B from the entry condenser lens 22 are launched, an exit condenser lens 23 configured to collect the laser beams B emitted from the measured fiber S and having an NA of 0.016, and a beam profiler 24 for measuring the near field pattern (NFP) of the laser beams B emitted from the exit condenser lens 23.

Figure 5:
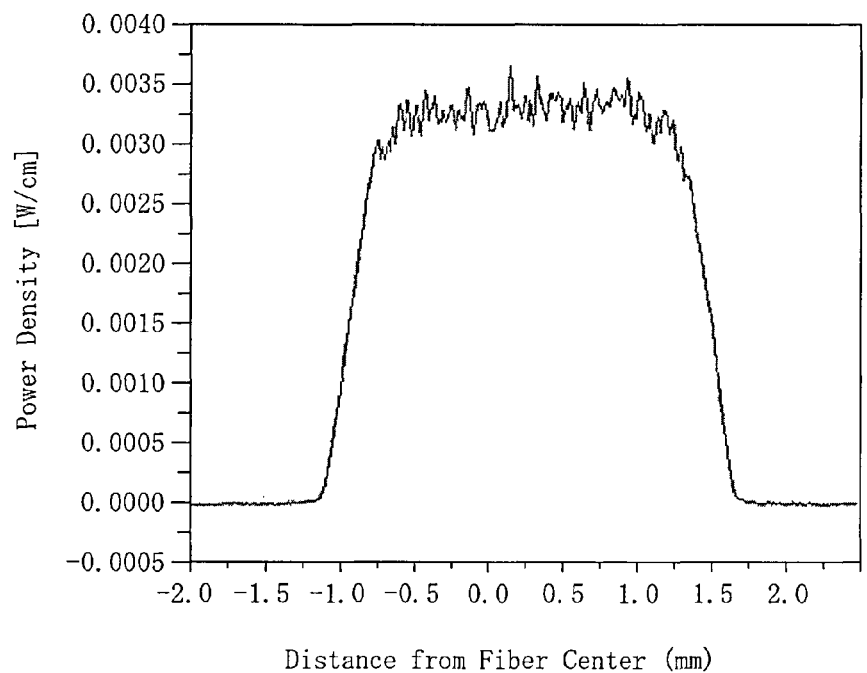
Figure 7:
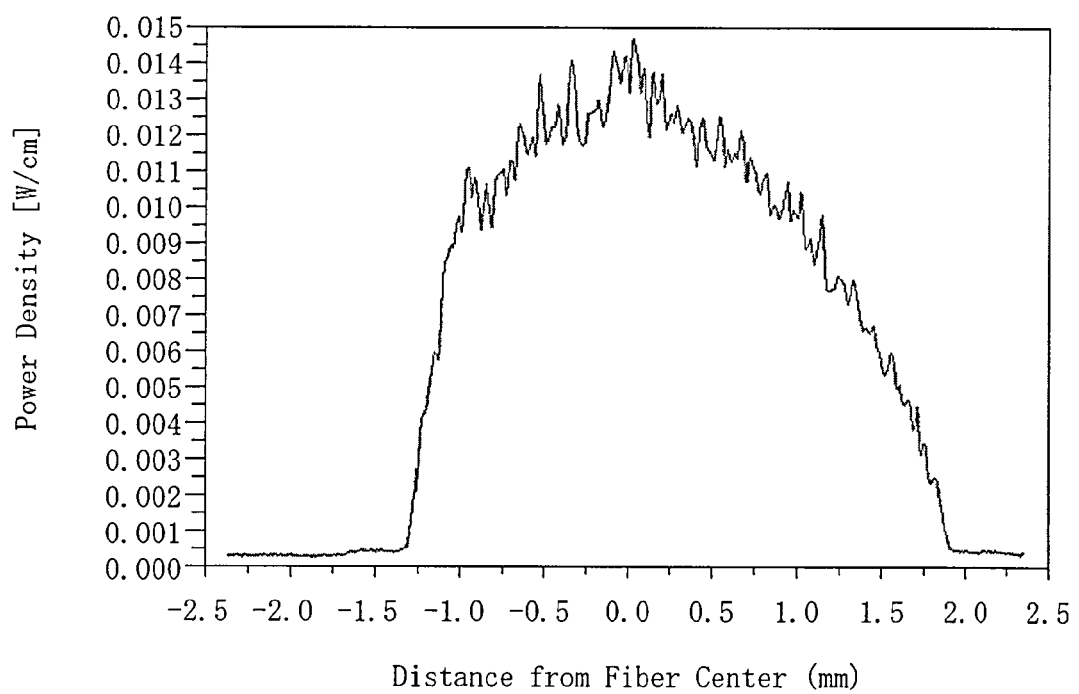
FIG. 7 is the profile of a laser beam emitted from a comparative article corresponding to a conventional optical fiber.

FIGS. 5 and 7 are the beam profiles detected by the beam profiler 24. Specifically, FIG. 5 is the profile of a laser beam emitted from an embodiment corresponding to the optical fiber 10a of this embodiment. FIG. 7 is the profile of a laser beam emitted from a comparative article corresponding to a conventional optical fiber including a core having a circular cross section.

The embodiment, i.e., the optical fiber (10a), is fabricated under the following conditions: the temperature of the drawing furnace 11 is 2050° C.; and the drawing speed of the core 1a is 5 m/min. A cross section of the core 1a has dimensions of 336 μm×689 μm. The radius of curvature of each of the corners C of a cross section of the core 1a is 35 μm. The outside diameter of the cladding 2 is 1.16 mm. The outside diameter of the protection layer 3 is 2.0 mm.

As can be seen by comparing FIG. 5 with FIG. 7, it was observed that while the comparative article (FIG. 7) emits a laser beam having a Gaussian intensity distribution, the embodiment (FIG. 5) emits a laser beam with uniform irradiation intensities.

As described above, according to the optical fiber 10a of this embodiment and the method for fabricating the same, the core material 5 having a rectangular cross section is heated and stretched in an atmosphere at 1950-2050° C. in the core formation process step. Therefore, the corners C of a rectangular cross section of the core 1a each have a radius of curvature of 1/100-1/10 of the length of a long side of the rectangle forming the cross section. This allows the core 1a to have a specific rectangular cross section, thereby obtaining uniform irradiation intensities of a laser beam emitted from one fiber end. Furthermore, since the core 1a is made of the core material 5 of quartz generally having high heat resistance, a laser beam with high energy density can be transmitted. Moreover, since the cladding 2 is made of the silicone resin 6 generally having a low refractive index, the refractive index of the cladding 2 is lower than that of the core 1a. Thus, a laser beam entering the core 1a is transmitted while being repeatedly reflected off the interface between the core 1a and the cladding 2. In view of the above, a laser beam with high energy density enters the end of the core 1a corresponding to one fiber end, and is transmitted through the core 1a, and then the transmitted laser beam with uniform irradiation intensities is emitted from the end of the core 1a corresponding to the other fiber end. This can provide an optical fiber from which a laser beam with uniform irradiation intensities is emitted.

<<Second Embodiment of the Invention>>

Figure 6:
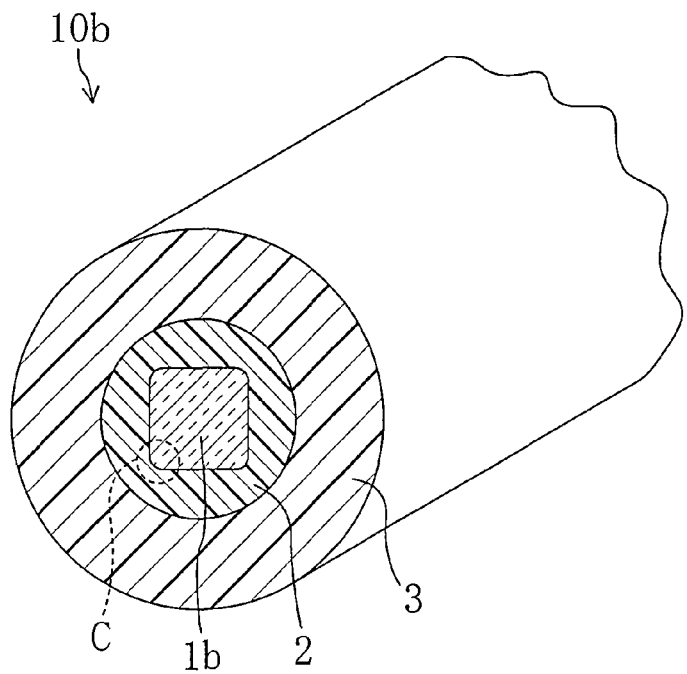
FIG. 6 is a perspective view of an optical fiber 10b according to a second embodiment.

FIG. 6 is a perspective view of an optical fiber 10b of this embodiment. In the following embodiment, the same reference characters as those in FIGS. 1-5 are used to represent equivalent elements, and the detailed explanation thereof will be omitted.

Although the optical fiber 10a of the first embodiment includes the core 1a having an oblong rectangular cross section, the optical fiber 10b of this embodiment includes a core 1b having a square cross section. Here, the core 1b can be formed by changing the shape of the core material 5 used in the core formation process step of the first embodiment. Specifically, the core 1b is formed under the following conditions: the dimensions of a core material (5) are approximately 20 mm high by 20 mm wide by 200 mm long; the temperature of a drawing furnace 11 is 2020° C.; and the drawing speed of the core 1b is 8 m/min. The optical fiber 10b can be fabricated which includes the core 1b having a square cross section with dimensions of, e.g., 356 μm×356 μm and configured such that the radius of curvature of each of the corners C of the cross section is 12 μm, a cladding 2 having an outside diameter of 0.782 mm, and a protection layer 3 having an outside diameter of 1.3 mm.

According to the optical fiber 10b of this embodiment and the method for fabricating the same, the corners C of a cross section of the square core 1b each have a radius of curvature of 1/100-1/10 of the length of one side of the square forming a cross section of the core 1b like the first embodiment. This can provide an optical fiber from which a laser beam with uniform irradiation intensities is emitted.

INDUSTRIAL APPLICABILITY

As described above, according to the present invention, a laser beam with uniform irradiation intensities is emitted, and therefore, the present invention is useful for laser machining, such as a surface ablation process for semiconductor.

The invention claimed is:

1. A method for fabricating an optical fiber, the method comprising:
    forming a core having a rectangular cross section by heating and stretching a core material having an oblong rectangular or square cross section and made of quartz; and
    forming a cladding having a circular outer cross-sectional shape by coating a side surface of the core with resin,
    wherein in the forming the core, the core material is heated and stretched at 1950-2050° C. so that corners of a cross section of the core each have a radius of curvature of 1/100-1/10 of a length of a long side of an oblong rectangle forming the cross section of the core or a length of one side of a square forming the cross section of the core.

2. The method of claim 1, wherein
the cladding is made of a thermosetting silicone resin.

* * * * *